(12) United States Patent
Sohal

(10) Patent No.: US 12,116,040 B2
(45) Date of Patent: Oct. 15, 2024

(54) VEHICLE WITH CRASH IMPACT ABSORBING ARRANGEMENT

(71) Applicant: VOLVO TRUCK CORPORATION, Gothenburg (SE)

(72) Inventor: Satbir Sohal, Maharashtra (IN)

(73) Assignee: VOLVO TRUCK CORPORATION, Gothenburg (SE)

(*) Notice: Subject to any disclaimer, the term of this patent is extended or adjusted under 35 U.S.C. 154(b) by 290 days.

(21) Appl. No.: 17/905,095

(22) PCT Filed: Feb. 11, 2021

(86) PCT No.: PCT/EP2021/053331
§ 371 (c)(1),
(2) Date: Aug. 26, 2022

(87) PCT Pub. No.: WO2021/175560
PCT Pub. Date: Sep. 10, 2021

(65) Prior Publication Data
US 2023/0148335 A1    May 11, 2023

(30) Foreign Application Priority Data
Mar. 3, 2020    (IN) .............. 202041009049

(51) Int. Cl.
*B62D 21/15*    (2006.01)
*B62D 25/08*    (2006.01)
(52) U.S. Cl.
CPC ........... *B62D 21/152* (2013.01); *B62D 25/08* (2013.01); *B62D 25/082* (2013.01)
(58) Field of Classification Search
CPC .... B62D 21/152; B62D 25/08; B62D 25/082; B62D 33/00
(Continued)

(56) References Cited

U.S. PATENT DOCUMENTS

| | | | | |
|---|---|---|---|---|
| 6,099,039 A * | 8/2000 | Hine | ............... | B62D 21/11 |
| | | | | 180/311 |
| 6,533,348 B1 * | 3/2003 | Jaekel | ............... | B62D 29/00 |
| | | | | 296/205 |

(Continued)

FOREIGN PATENT DOCUMENTS

| | | |
|---|---|---|
| CN | 109421498 A | 3/2019 |
| CN | 208842487 U | 5/2019 |

(Continued)

OTHER PUBLICATIONS

Chinese Office Action dated Jan. 30, 2024 in corresponding Chinese Patent Application No. 202180016913.0, 13 pages.

(Continued)

*Primary Examiner* — Jason S Morrow
(74) *Attorney, Agent, or Firm* — Venable LLP; Jeffri A. Kaminski

(57) ABSTRACT

A vehicle includes a crash impact absorbing arrangement including a front structure having a lower portion attached to the frame and an upper portion arranged between the cabin and the front end of the vehicle. The front structure is configured to collapse towards a rear end of the vehicle when a force directed towards the rear end of the vehicle acting on the upper portion of the front structure reaches a threshold force. A rear structure having a lower portion attached to the frame and an upper portion, the rear structure being configured to withstand a force directed towards the rear end of the vehicle acting on the upper portion of the rear structure exceeding the threshold force. At least one deformable energy absorbing structure is arranged between the upper portion of the front structure and the upper portion of the rear structure.

12 Claims, 5 Drawing Sheets

(58) Field of Classification Search
USPC .............................. 296/187.09, 205, 203.02
See application file for complete search history.

(56) References Cited

U.S. PATENT DOCUMENTS

| | | | |
|---|---|---|---|
| 7,416,243 B2* | 8/2008 | Dammann | B62D 33/06 |
| | | | 296/190.08 |
| 7,472,946 B2* | 1/2009 | Hollenbeck | B62D 25/10 |
| | | | 296/190.04 |
| 8,459,728 B2 | 6/2013 | Fujii et al. | |
| 9,855,914 B1 | 1/2018 | Hammer et al. | |
| 10,654,530 B2* | 5/2020 | Milton | B60J 1/008 |
| 10,780,922 B2* | 9/2020 | Lam | C22C 38/54 |
| 11,565,578 B2* | 1/2023 | Shimizu | B60K 1/04 |
| 2003/0230443 A1* | 12/2003 | Cramer | B62D 21/152 |
| | | | 180/65.51 |
| 2009/0129860 A1 | 5/2009 | Laturner et al. | |
| 2010/0102596 A1* | 4/2010 | Chapman | B62D 63/025 |
| | | | 296/205 |
| 2010/0140967 A1 | 6/2010 | List | |
| 2012/0248820 A1 | 10/2012 | Yasui et al. | |
| 2016/0039461 A1* | 2/2016 | Kurokawa | B62D 21/07 |
| | | | 296/203.01 |
| 2016/0039463 A1* | 2/2016 | Ormiston | B60P 1/28 |
| | | | 296/205 |
| 2016/0257360 A1* | 9/2016 | Mackenzie | B62D 63/025 |
| 2024/0217584 A1* | 7/2024 | Sohal | B62D 21/02 |

FOREIGN PATENT DOCUMENTS

| | | |
|---|---|---|
| DE | 102005028770 A1 | 12/2006 |
| IN | 3294MUM2012 | 5/2014 |
| JP | 8-230724 A | 9/1996 |
| JP | 11-240463 A | 9/1999 |
| JP | 2008513629 A | 5/2008 |
| JP | 5047796 B2 | 10/2012 |
| JP | 5222374 B2 | 6/2013 |
| JP | 2016094135 A | 5/2016 |
| WO | 2009057379 A1 | 5/2009 |

OTHER PUBLICATIONS

International Search Report and Written Opinion in corresponding International Application No. PCT/EP2021/053331 mailed Apr. 30, 2021 (15 pages).
Second Written Opinion of the International Preliminary Examining Authority in corresponding International Application No. PCT/EP2021/053331 mailed Jan. 20, 2022 (8 pages).
International Preliminary Report on Patentability in corresponding International Application No. PCT/EP2021/053331 mailed Jun. 1, 2022 (7 pages).

* cited by examiner

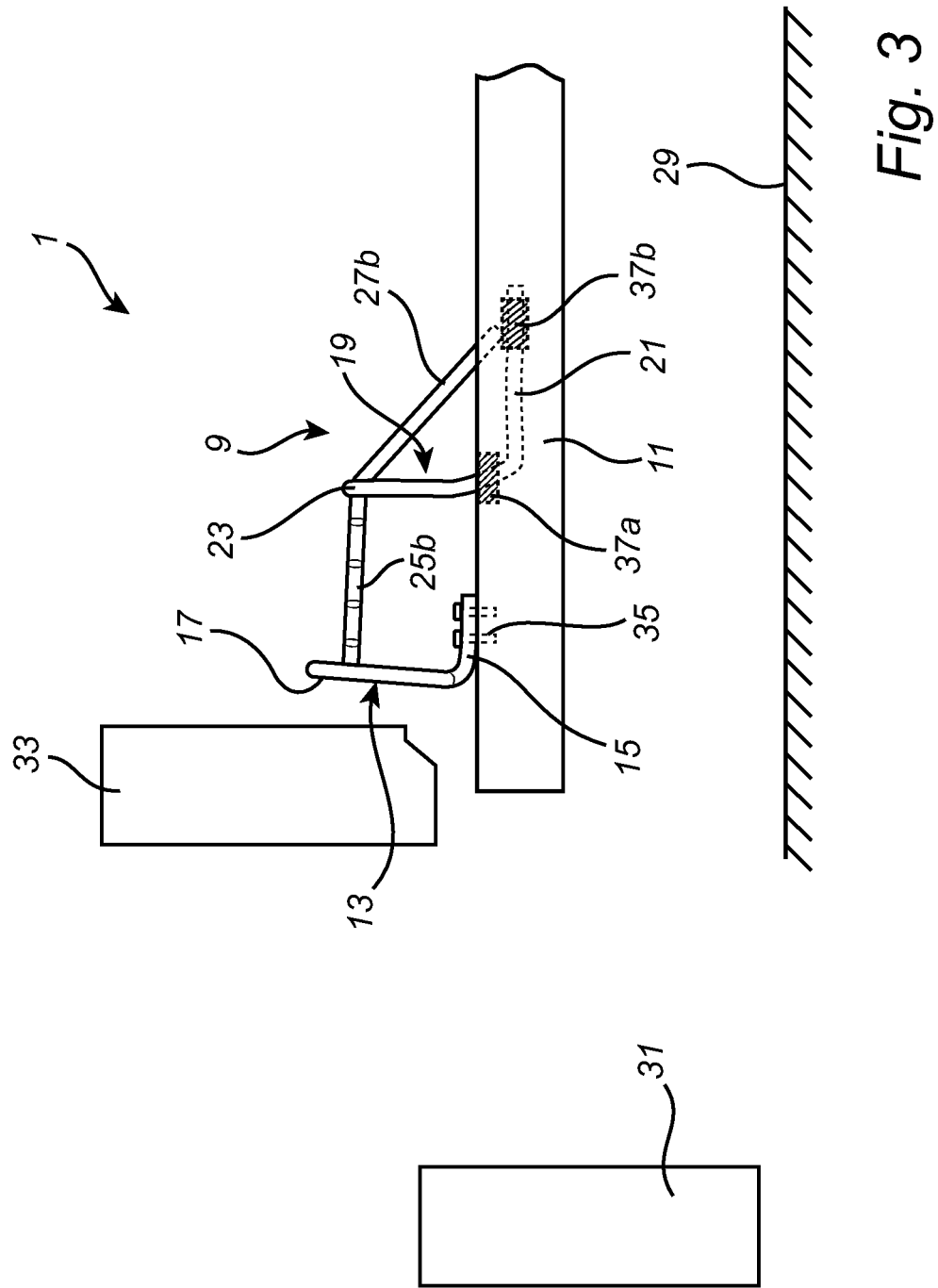

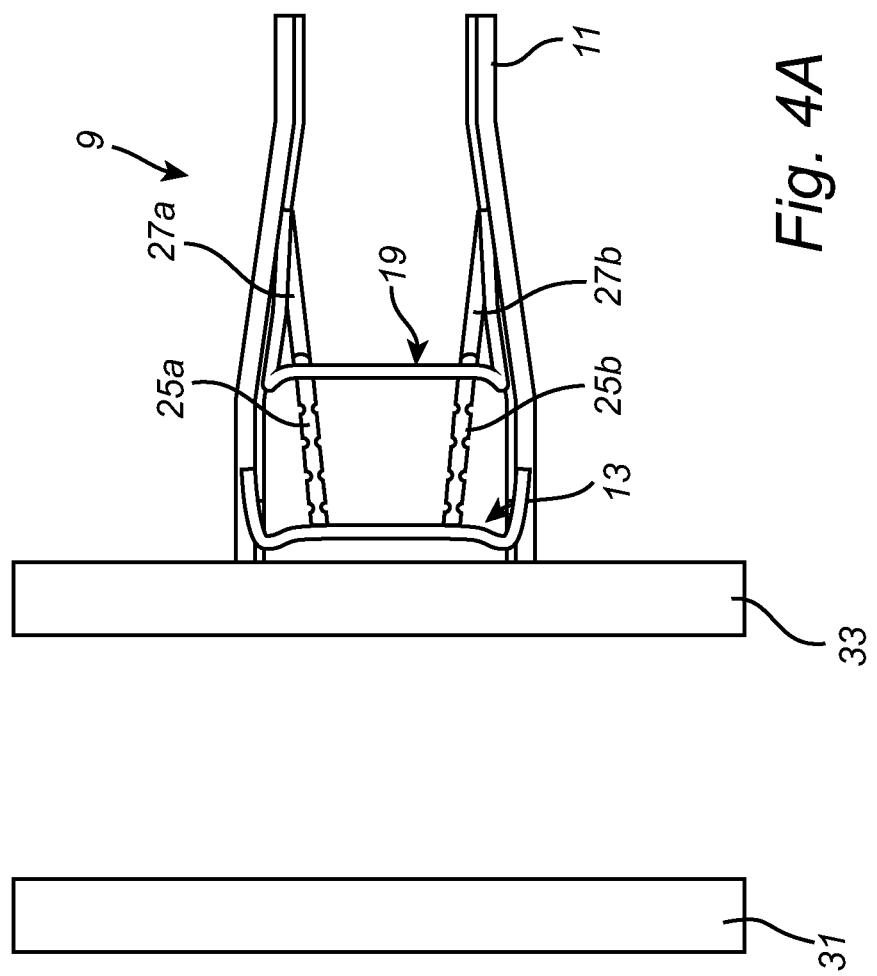

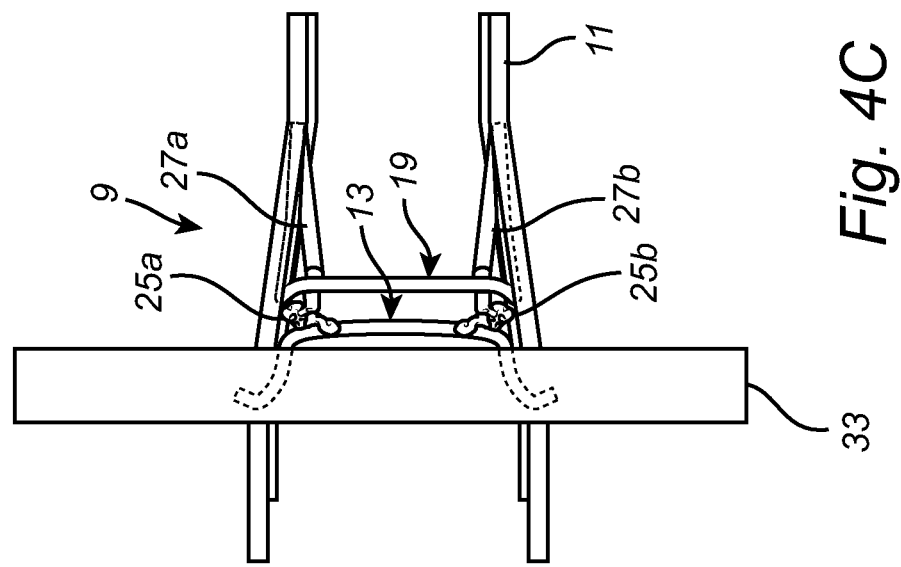
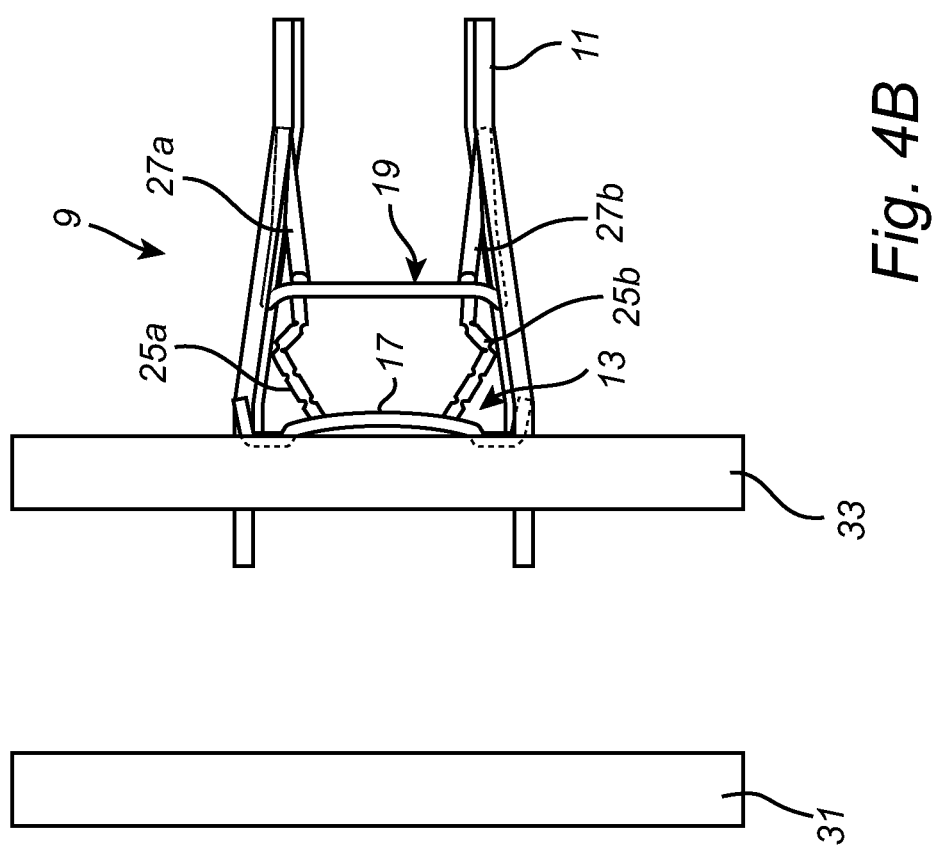

VEHICLE WITH CRASH IMPACT ABSORBING ARRANGEMENT

CROSS-REFERENCE TO RELATED APPLICATIONS

This application is a U.S. National Stage application of PCT/EP2021/053331, filed Feb. 11, 2021 and published on Sep. 10, 2021, as WO 2021/175560, which claims the benefit of Indian Patent Application No. 202041009049, filed Mar. 3, 2020, all of which are hereby incorporated by reference in their entireties.

TECHNICAL FIELD

The invention relates to a vehicle comprising a frame; a cabin; a forward compartment extending from the cabin towards the front end; and a crash impact absorbing arrangement at least partly arranged in the forward compartment.

The invention can be applied in heavy-duty vehicles, such as trucks, buses and construction equipment. Although the invention will be described with respect to a truck, the invention is not restricted to this particular vehicle, but may also be used in other vehicles, for instance pick-up trucks or relatively large and high passenger cars.

BACKGROUND

A particularly difficult crash scenario for a truck, bus or other high vehicle is a forward collision into the back of the trailer of a heavy vehicle. In a conventional truck with a forward compartment accommodating the engine, the engine absorbs much of the energy of the impact, transfers it to the chassis frame and slows down the vehicle. This facilitates a design in which the deformation of the cabin can be minimized, which in turn reduces the risk of injury of the driver in the cabin.

JP H08 230724 discloses a cab over truck with an energy absorbing member for absorbing a shock energy applied to the cab at the time of a collision is disposed between the cab disposed on an under carriage frame and the under carriage frame.

In a fully electric vehicle, however, there is no engine in the forward compartment, which means that safety in the event of a crash scenario, including the above-described forward collision needs to achieved by other means.

SUMMARY

An object of the invention is to provide for an improved crash safety in a vehicle lacking an internal combustion engine in its forward compartment.

According to the invention, this object is achieved by a vehicle comprising a frame; a cabin; a forward compartment extending from the cabin towards a front end of the vehicle; and a crash impact absorbing arrangement at least partly arranged in the forward compartment, wherein the crash impact absorbing arrangement comprises: a front structure having a lower portion attached to the frame and an upper portion arranged between the cabin and the front end of the vehicle, the front structure being configured to collapse towards a rear end of the vehicle when a force directed towards the rear end of the vehicle acting on the upper portion of the front structure reaches a predefined threshold force; a rear structure having a lower portion attached to the frame and an upper portion, the rear structure being configured to withstand a force directed towards the rear end of the vehicle acting on the upper portion of the rear structure exceeding the predefined threshold force; and at least one deformable energy absorbing structure arranged between the upper portion of the front structure and the cabin, and configured to transfer a force directed towards the rear end of the vehicle acting on the upper portion of the front structure to the upper portion of the rear structure, while being deformed to allow movement of the upper portion of the front structure towards the upper portion of the rear structure.

The present invention is based on the realization that the energy absorbing functionality of a forward mounted internal combustion engine can be fulfilled by a crash impact absorbing arrangement with a relatively weak front structure, a relatively strong rear structure and at least one deformable energy absorbing structure connecting upper portions of the front structure and the rear structure. With the provision of such a crash impact absorbing arrangement, the present inventor has found that the safety in the event of a crash scenario, including a forward collision, can be maintained or improved in the absence of a forward mounted internal combustion engine. Furthermore, the crash impact absorbing arrangement comprised in the vehicle according to various embodiments of the present invention may also reduce the tendency of the vehicle to pitch forward in the event of a forward collision, which also provides for improved integrity of the cabin.

According to embodiments, the upper portion of the rear structure may be arranged between the cabin and the upper portion of the front structure. This configuration may provide for further improved integrity of the cabin space.

According to embodiments of the present invention, the vehicle may be a relatively high vehicle, such as a truck or a bus, and the crash impact absorbing arrangement may then be particularly effective for handling a forward collision into the back of another high vehicle, particularly a trailer, such as corresponding to a Trailer back vehicle impact testing situation.

For particularly efficient handling of this kind of forward collision, the upper portion of the front structure may be arranged at least 0.5 meter above road level. More advantageously, the upper portion of the front structure may be arranged at least 1 meter above road level. This high arrangement of the upper portion of the front structure increases the probability that the upper portion of the front structure can start to absorb energy of the collision at an early stage from an upper barrier impact and transfer load to the chassis frame, providing for improved safety.

In embodiments, furthermore, the upper portion of the rear structure may be arranged at least 0.5 meter above road level. More advantageously, the upper portion of the rear structure may be arranged at least 1 meter above road level. In particular, the upper portion of the rear structure may advantageously be arranged at substantially the same height as the upper portion of the front structure. This configuration may further improve the load transfer dynamics in the event of a forward collision, and reduce the tendency of the vehicle to pitch forward.

The front structure may be configured in various ways for it to collapse backwards when the upper portion thereof is subjected to a sufficiently large force. According to one embodiment, the lower portion of the front structure may be attached to the frame by an attachment structure designed to fail when a force directed towards the rear end of the vehicle acting on the upper portion of the front structure reaches the predefined threshold force. The attachment structure may be any suitable attachment structure, such as bolts, brackets, welds, or any other attachment structure used in vehicle manufacturing. As an alternative or complement, the front structure itself may be dimensioned to be deformed when a sufficiently large force is acting on the upper portion thereof.

According to embodiments, the lower portion of the rear structure may be attached to the frame by an attachment structure designed to remain intact when a force directed towards the rear end of the vehicle acting on the upper portion of the rear structure reaches the predefined threshold force. The attachment structure may be any suitable attachment structure, such as bolts, brackets, welds, or any other attachment structure used in vehicle manufacturing.

In embodiments, the attachment structure attaching the front structure to the frame and the attachment structure attaching the rear structure to the frame may be different. For instance, the front structure may be attached to the frame by bolts and the rear structure may be attached to the frame by welds, or both the front and rear structures may be attached to the frame by welds, but a larger number of welds may be used for attaching the rear structure, etc.

According to various embodiments, furthermore, the crash impact absorbing arrangement may further comprise at least one strut arranged between the upper portion of the rear structure and the frame. This at least one strut may act to ensure that the rear structure withstands a backwards force acting on the upper portion of the rear structure exceeding the predefined threshold force. As an alternative or complement, the rear structure of the crash impact absorbing arrangement may be made of high-strength steel.

In embodiments, the longitudinal distance between the upper portion of the front structure and the upper portion of the rear structure may be at least 0.5 meter. More advantageously, the longitudinal distance between the upper portion of the front structure and the upper portion of the rear structure may be at least 1 meter. This minimum distance may facilitate the design of the at least one deformable energy absorbing structure arranged between the upper portion of the front structure and the upper portion of the rear structure.

To achieve efficient use of the space in the forward compartment, and also to protect the cooling system of the vehicle, the upper portion of the front structure may surround at least a portion of the cooling system, such as a front fan of the cooling system.

In summary, embodiments of the present invention thus relate to a vehicle comprising a crash impact absorbing arrangement including a front structure having a lower portion attached to the frame and an upper portion arranged between the cabin and the front end of the vehicle, the front structure being configured to collapse towards a rear end of the vehicle when a force directed towards the rear end of the vehicle acting on the upper portion of the front structure reaches a threshold force; a rear structure having a lower portion attached to the frame and an upper portion, the rear structure being configured to withstand a force directed towards the rear end of the vehicle acting on the upper portion of the rear structure exceeding the threshold force; and at least one deformable energy absorbing structure arranged between the upper portion of the front structure and the upper portion of the rear structure.

BRIEF DESCRIPTION OF THE DRAWINGS

With reference to the appended drawings, below follows a more detailed description of embodiments of the invention cited as examples.

In the drawings:

FIG. 3 is a schematic illustration from the side of a forward collision crash scenario into the rear of a trailer of a truck.

FIGS. 4A-C schematically illustrate, from a top view, a characteristic behavior of the crash impact absorbing arrangement according to embodiments of the present invention during the forward collision crash scenario shown in FIG. 3.

DETAILED DESCRIPTION OF EXAMPLE EMBODIMENTS OF THE INVENTION

Figure 1:
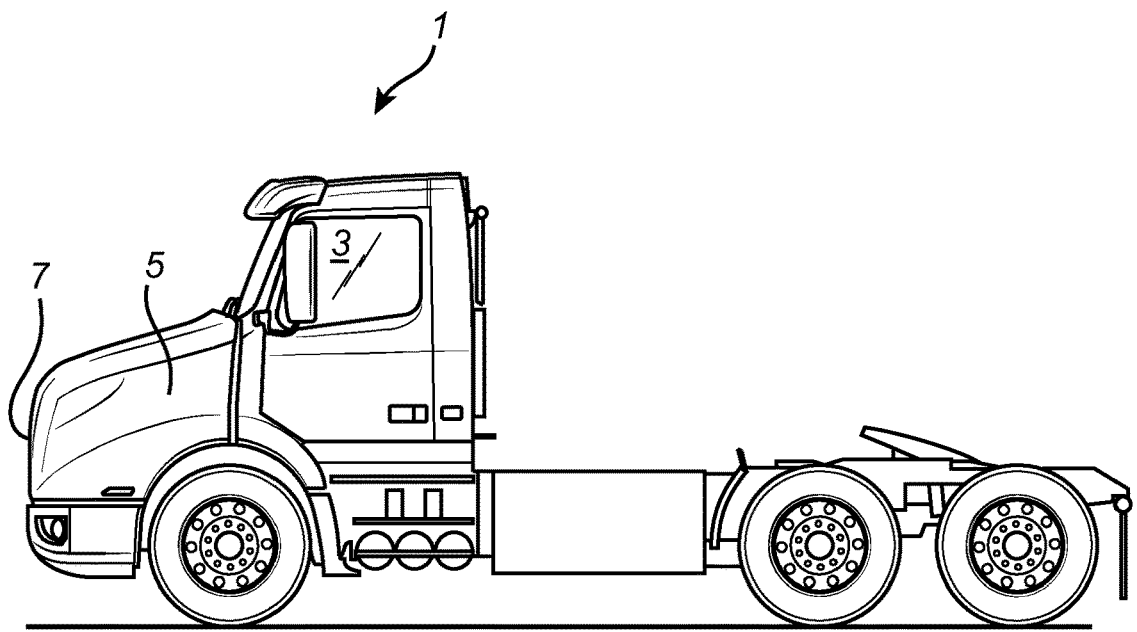
FIG. 1 is a side view of a vehicle according to an embodiment of the present invention, in the form of a truck having a forward compartment and a crash impact absorbing arrangement at least partly arranged in the forward compartment.

FIG. 1 schematically shows a vehicle, here in the form of a truck 1, comprising a cabin 3 and a forward compartment 5 extending from the cabin 3 towards a front end 7 of the truck 1. The truck 1, which may be a fully electric truck or at least a truck without an internal combustion engine in the forward compartment 5, additionally comprises a frame and a crash impact absorbing arrangement. These parts are, however, not visible in FIG. 1, but will be described in greater detail below.

Figure 2A:
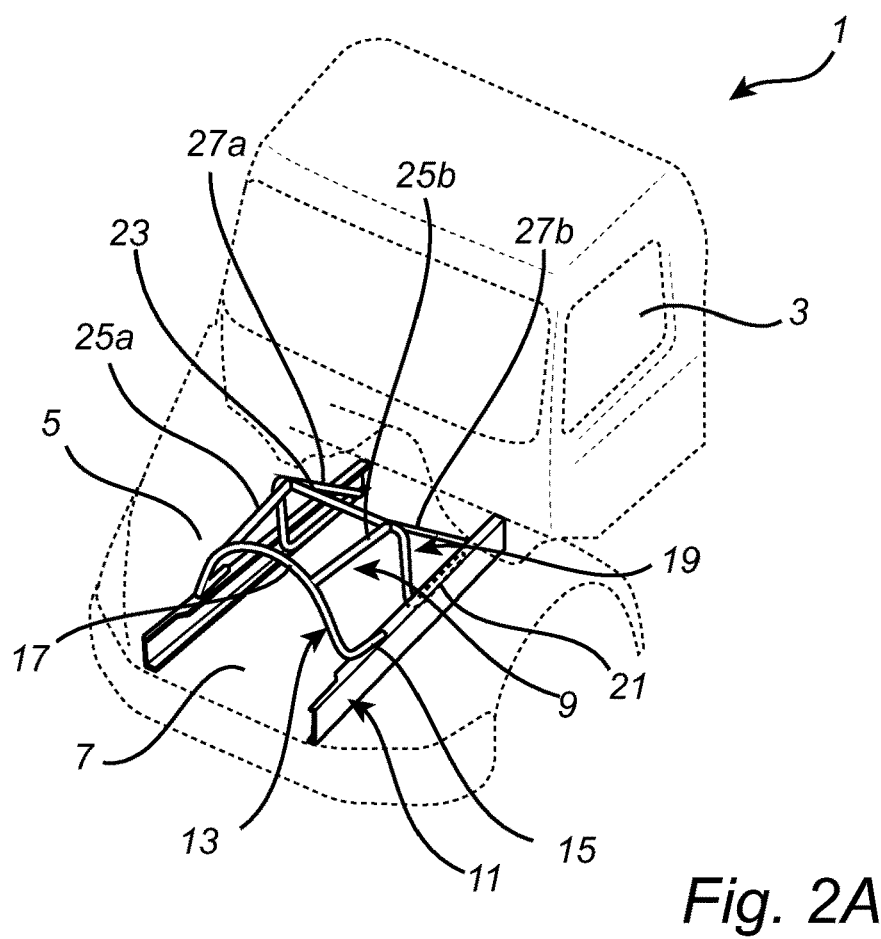
FIG. 2A-B are different views of the crash impact absorbing arrangement comprised in the vehicle in FIG. 1.
Figure 2B:
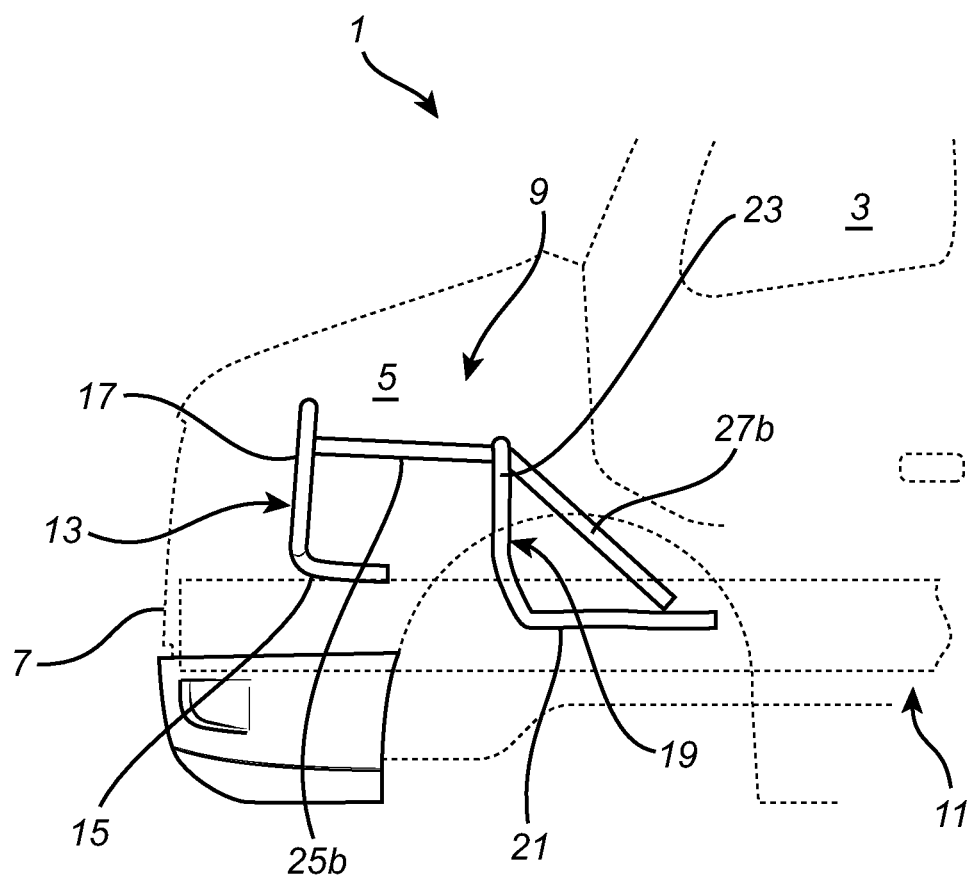

Referring now to FIGS. 2A-B, the truck 1 thus comprises an exemplary crash impact absorbing arrangement 9 and a frame 11. The crash impact absorbing arrangement 9 comprises a front structure 13 having a lower portion 15 and an upper portion 17, a rear structure 19 having a lower portion 21 and an upper portion 23, first 25a and second 25b deformable energy absorbing structures, and first 27a and second 27b high-strength material structures, here exemplified by struts.

As is schematically shown in FIGS. 2A-B, the lower portion 15 of the front structure 13 is attached to the frame 11, and the upper portion 17 of the front structure 13 is arranged between the cabin 13 and the front end 7 of the truck 1. The lower portion 21 of the rear structure 19 is attached to the frame 11 and the upper portion 23 of the rear structure 19 is arranged further away from the front end 7 of the truck 1 than the upper portion 17 of the front structure 13. The first 25a and second 25b deformable energy absorbing structures are arranged between the upper portion 17 of the front structure 13 and the upper portion 23 of the rear structure 19, and the first 27a and second 27b struts are attached to the frame 11 and extend from the frame 11 to the upper portion 23 of the rear structure 19 to provide additional strength to the rear structure 19.

The front structure 13 is configured to collapse towards a rear end of the truck 1 when a force directed towards the rear end of the truck 1 acting on the upper portion 17 of the front structure 13 reaches a predefined threshold force $F_{th}$. The rear structure 19 is configured to withstand a force directed towards the rear end of the truck 1 acting on the upper portion 23 of the rear structure 19 exceeding the predefined threshold force $F_{th}$. The energy absorbing structures 25a-b are arranged between the upper portion 17 of the front structure 13 and the upper portion 23 of the rear structure 19 for transferring a force directed towards the rear end of the truck 1 acting on the upper portion 17 of the front structure 13 to the upper portion 23 of the rear structure 19, while being deformed to allow movement of the upper portion 17 of the front structure 13 towards the upper portion 23 of the rear structure 19, following (and during) collapse of the front structure 13.

This crash impact absorbing arrangement 9 not only absorbs the impact energy of a forward collision in a controlled way, but also prevents pitching of the truck 1 which would change the impact height of the cabin 3 to the upper barrier in the case of a Trailer back vehicle impact test scenario.

As will be described in greater detail further below, this crash impact absorbing arrangement 9 can functionally replace the internal combustion engine of a conventional truck in terms of protecting the integrity of the cabin 3 in the event of a forward collision, in particular a forward collision into the back of a trailer.

In the example configuration of FIGS. 2A-B, the front structure 13 of the crash impact absorbing arrangement 9 is arch-shaped to at least partly surround the front fan (not shown in FIGS. 2A-B) of the cooling system (also not shown) of the truck 1. Hereby, the crash impact absorbing arrangement 9 provides protection for the cooling system, while efficiently utilizing the space available in the forward compartment 5. It should, however, be noted that the front structure 13, the rear structure 19 and the at least one deformable energy absorbing structure 25a-b may be realized in many different ways well within the reach of one of ordinary skill in the art, as long as they are dimensioned and configured to collapse in the desired manner in the event of a forward collision. For instance, neither the front structure 13, nor the rear structure 19 has to be configured as an arch, but could, for example, be provided as one or several front pillars and one or several rear pillars.

In FIGS. 2A-B, the upper portion 23 of the rear structure 19 is arranged between the cabin 3 and the upper portion 17 of the front structure 13. It should, however, be noted that although this configuration may be advantageous, it may be feasible to arrange the upper portion 23 of the rear structure 19 further back in the truck 1 depending on the overall configuration of the truck 1. For instance, the upper portion 23 of the rear structure 19 could be arranged below a portion of the cabin 3.

Furthermore, the struts 27a-b in FIGS. 2A-B represent only one exemplary way of achieving the specified properties of the rear structure 19. As will be clear to one of ordinary skill in the art, there are many other ways of achieving the same properties, such as for example by choice of materials or dimensions of the rear structure 19 and/or by connecting the rear structure 19 and the frame 11 using other well-known force transmitting means.

FIG. 3 is a schematic illustration from the side of a forward collision crash scenario into the rear of a trailer of a truck. For illustrative purposes, FIG. 3 does not show the entire truck 1, but only the crash impact absorbing arrangement 9 and the frame 11 in relation to the road level 29. Also shown in FIG. 3 are a lower crash barrier 31 and an upper crash barrier 33 representing the situation with a forward collision into the back of a trailer. As can be understood from FIG. 3, the crash impact absorbing arrangement 9 may advantageously be arranged and configured to absorb the energy of the impact with the upper barrier 33, to prevent or at least reduce damage to the cabin 3. Therefore, the upper portion 17 of the front structure 13 may advantageously extend at least as far upwards as 0.5 meter above the road level 29. Even more advantageously, the upper portion 17 of the front structure 13 may extend at least as far upwards as 1 meter above the road level 29. The same would be valid for the upper portion 23 of the rear structure 19.

When the truck 1 collides with the upper barrier 33 with sufficient speed, the upper portion 17 of the front structure 13 will be subjected to a force in excess of the above-mentioned threshold force $F_{th}$. This should result in collapse of the front structure 13. One convenient way of achieving this desired collapse may be to mount the lower portion 15 of the front structure 13 to the frame 11 using bolts 35 designed to fail at a critical load corresponding to the above-mentioned threshold force $F_{th}$ acting on the upper portion 17. As the front structure 13 collapses, the rear structure 19 should remain substantially undeformed throughout the collision event. This may be achieved by one or several design measures. Some such exemplary design measures are schematically indicated in FIG. 3. For instance, the lower portion 21 of the rear structure 19 may be welded to the frame 11, as is indicated in FIG. 3 by exemplary schematic welding locations 37a-b. In addition, or as an alternative to the welding, the upper portion 23 of the rear structure 29 may be supported by struts 27a-b, and/or the rear structure may be made of a durable material, such a high-strength steel.

When, during the forward collision, the front structure 13 collapses while the rear structure 19 remains substantially undeformed, the energy of the collision is mainly absorbed by deformation of the deformable energy absorbing structures 25a-b. This is schematically illustrated in FIGS. 4A-C, which are simulations of the state of the crash impact absorbing arrangement 9 at different stages of the collision with the obstacle represented by the lower 31 and upper 33 barriers.

FIGS. 4A-C schematically illustrate, from a top view, an exemplary characteristic behavior of the crash impact absorbing arrangement 9 according to embodiments of the present invention during the forward collision crash scenario shown in FIG. 3.

Referring first to FIG. 4A, the crash impact absorbing arrangement 9 has not yet impacted with the upper barrier 33 and is thus undeformed.

In FIG. 4B, the upper portion 17 has been subjected to a force in excess of the above-mentioned threshold force $F_{th}$, resulting in a collapse of the front structure 13. The collapse of the front structure 13, in turn, results in deformation of the energy absorbing structures 25a-b, as is schematically indicated in FIG. 4B.

Finally, in FIG. 4C, the energy absorbing structures 25a-b are fully deformed, while the rear structure 19 remains substantially intact.

In the example configuration of the crash impact absorbing arrangement 9 indicated here, the energy absorbing structures 25a-b have been provided in the form of tubes with spaced apart recesses to guide the tube to bend sideways when loaded longitudinally. As is well known to those of ordinary skill in the art, there are many other ways to achieve the desired behavior of the energy absorbing structures 25a-b, such as by using a conventional crash box configuration.

It is to be understood that the present invention is not limited to the embodiments described above and illustrated in the drawings; rather, the skilled person will recognize that many changes and modifications may be made within the scope of the appended claims. For example, the crash impact absorbing arrangement 9 may comprise one or several additional structures arranged between the front structure 13 and the rear structure 19.

The invention claimed is:

1. A heavy-duty vehicle comprising a frame; a cabin; a forward compartment extending from the cabin towards a front end of the vehicle; and a crash impact absorbing arrangement at least partly arranged in the forward compartment, wherein the crash impact absorbing arrangement comprises:
- a front structure having a lower portion attached to the frame and an upper portion arranged between the cabin and the front end of the vehicle, the front structure being configured to collapse towards a rear end of the vehicle when a force directed towards the rear end of the vehicle acting on the upper portion of the front structure reaches a threshold force;
- a rear structure having a lower portion attached to the frame and an upper portion, the rear structure being configured to withstand a force directed towards the rear end of the vehicle acting on the upper portion of the rear structure exceeding the threshold force; and
- at least one deformable energy absorbing structure arranged between the upper portion of the front structure and the upper portion of the rear structure, and configured to transfer a force directed towards the rear end of the vehicle acting on the upper portion of the front structure to the upper portion of the rear structure, while being deformed to allow movement of the upper portion of the front structure towards the upper portion of the rear structure,
- wherein the upper portion of the rear structure is arranged between the cabin and the upper portion of the front structure.

2. The vehicle according to claim 1, wherein the upper portion of the front structure extends to at least 0.5 meter above road level.

3. The vehicle according to claim 2, wherein the upper portion of the rear structure extends to at least 0.5 meter above road level.

4. The vehicle according to claim 1, wherein the lower portion of the front structure is attached to the frame by an attachment structure designed to fail when a force directed towards the rear end of the vehicle acting on the upper portion of the front structure reaches the threshold force.

5. The vehicle according to claim 1, wherein the lower portion of the rear structure is attached to the frame by an attachment structure designed to remain intact when a force directed towards the rear end of the vehicle acting on the upper portion of the rear structure reaches the threshold force.

6. The vehicle according to claim 1, wherein the crash impact absorbing arrangement further comprises at least one strut arranged between the upper portion of the rear structure and the frame.

7. The vehicle according to claim 1, wherein the rear structure is made of high-strength steel.

8. The vehicle according to claim 1, wherein the lower portion of the front structure is attached to the frame by at least one bolt, and the lower portion of the rear structure is welded to the frame.

9. The vehicle according to claim 1, wherein a longitudinal distance between the upper portion of the front structure and the upper portion of the rear structure is at least 0.5 meter.

10. The vehicle according to claim 1, wherein:
- the vehicle comprises a cooling system including a front fan; and
- the upper portion of the front structure surrounds the front fan.

11. The vehicle according to claim 1, wherein the vehicle lacks an internal combustion engine in the forward compartment.

12. The vehicle according to claim 11, wherein the vehicle is a fully electric vehicle.

* * * * *